United States Patent [19]
Cain et al.

[11] Patent Number: 6,023,066
[45] Date of Patent: Feb. 8, 2000

[54] ULTRAVIOLET RADIOMETER

[75] Inventors: Michael Scott Cain, Purcellville; Joe T. May, Leesburg; Matthew J. McConnell, Ashburn, all of Va.; Robert D. Radcliff, Houston, Tex.; Christopher S. Rogers, Sterling, Va.

[73] Assignee: Electronic Instrumentation and Technology, Inc., Sterling, Va.

[21] Appl. No.: 09/054,471

[22] Filed: Apr. 3, 1998

[51] Int. Cl.⁷ ....................................................... G01J 1/00
[52] U.S. Cl. .................................................................. 250/372
[58] Field of Search ....................... 250/372 R, 372 EM, 250/370.07

[56] References Cited

U.S. PATENT DOCUMENTS

5,008,548  4/1991  Gat ........................................... 250/372
5,382,799  1/1995  May ......................................... 250/372

*Primary Examiner*—Edward P. Westin
*Assistant Examiner*—Richard Hanig
*Attorney, Agent, or Firm*—Whitham, Curtis & Whitham

[57] ABSTRACT

An ultraviolet (UV) radiometer includes as one component a data collection unit which is sufficiently small that it can be placed in UV curing applications which have normally been inaccessible as another component a data reader into which the data collection unit is inserted for displaying and/or processing the actual data collected by the data collection unit during a process run. Because of its small size, the data collection unit makes it possible to obtain true process control in applications that could not previously be monitored. After making a dosage measurement, the data collection unit is inserted into the data reader to display the actual data collected during a UV curing run. After reading the data in the data collection unit, the data reader clears the previously stored data and resets the unit to take a new dosage reading.

17 Claims, 7 Drawing Sheets

ULTRAVIOLET RADIOMETER

BACKGROUND OF THE INVENTION

1. Field of the Invention

The present invention generally relates to the measurement of ultraviolet (UV) radiation and, more particularly, to a UV radiometer that includes a data collection unit at is applied to a high speed web carrying work pieces to measure UV dosage applied to the work pieces in a UV curing system.

2. Background Description

There are many substances, known as monomers, which can be converted to polymers by chemical reactions. In some cases, these reactions are induced by chemical catalysts and initiators. However, polymerization can also be induced by supplying the initiation energy with visible or ultraviolet (UV) light. Such photochemical reactions have practical as well as theoretical advantages. For example, in certain manufacturing processes, a polymer may be used to coat a surface. The photochemically induced polymerization is referred to as "curing".

There are many applications of UV cured polymers wherein the polymer is applied to a surface as, for example, web press applications, bottle printing, container decorating applications, compact disc (CD) and digital video (or versatile) disc (DVD). These applications require a curing station which typically includes a source of high intensity UV light to initiate the photochemical curing polymerization process.

As UV curing has evolved, it has become increasingly important to establish a method of measuring system performance. Degradation of UV lamps, light guides, and reflectors can cause decreases in UV intensity and create curing problems. If the intensity of the UV light falls below a certain level, curing may not be complete resulting in an incomplete polymerization of the coating. Moreover, a visual inspection will not reveal the problem as the surface of the monomer spot may polymerize but the interior volume will not. It has therefore become mandatory in certain applications to periodically measure the UV energy output of the curing system in order to insure that a sufficient UV intensity is being. However, such measurements are typically not conveniently made, or even possible, using current UV intensity measuring instruments in processes which employ a high speed web to carry work pieces through a curing station. In many cases, the curing applications are physically inaccessible. This has made true process control impossible and poses a continuing quality control problem for many applications.

SUMMARY OF THE INVENTION

It is therefore an object of the invention to provide a UV radiometer that may be used monitoring UV dosages in UV curing systems to provide true process control.

It is another object of the invention to provide a UV radiometer that includes as one component a data collection unit which is sufficiently small that it can be placed in UV curing applications which have normally been inaccessible.

It is yet another object of the invention to provide a UV radiometer that includes as one component a data collect unit having a size and shape that allows the data collection unit to be attached to a high speed web.

It is a further object of the invention to provide a UV radiometer that includes as another component a data reader into which the data collection unit is inserted for displaying and/or processing the actual data collected by the data collection unit during a process run.

According to the invention, there is provided a new and unique UV radiometer composed of two basic components; a small and compact electro-optic device that serves as a data collection unit and a data reader into which the data collection unit is inserted to display the actual data collected during a run. Because of its small size, the data collection unit makes it possible to obtain true process control in applications that could not previously be monitored. The data collection unit is small enough to permit placing in curing applications which, in the past, have been inaccessible. Such applications include, but are not limited to, web press applications, bottle printing, container decorating applications, and compact disc (CD) and digital video disc (DVD) coating applications.

The data collection unit is made of such size and shape as to allow the unit to be attached to a high speed web which passes through a UV curing station. To facilitate the attachment, there is provided a carrier for the data collection unit which may be applied to a high speed web. The carrier is made of flexible material with a pocket for receiving the data collection unit. The bottom surface of the carrier is covered with a suitable adhesive, possibly in the form of double faced tape, and the top surface of the carrier is covered with one half of a hook-and-loop material. The bottom surface adhesive adheres the carrier to the web, and the top surface of the carrier facilitates removal of the carrier from the web by means of the mating half of the hook-and-loop material. It is also possible manufacture the data collection unit on a flexible substrate which is integrated into the flexible carrier.

During a dosage measurement, the data collection unit periodically samples the UV dosage, detects and stores the peak dosage measurement for a measurement, and accumulates the total dosage for the measurement. These values, the peak dosage and the accumulated total dosage, are stored for later readout.

After making a dosage measurement, the data collection unit is inserted into the data reader to display the actual data collected during a UV curing run. After reading the data in the data collection unit, the data reader clears the previously stored data and resets the unit to take a new dosage reading.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
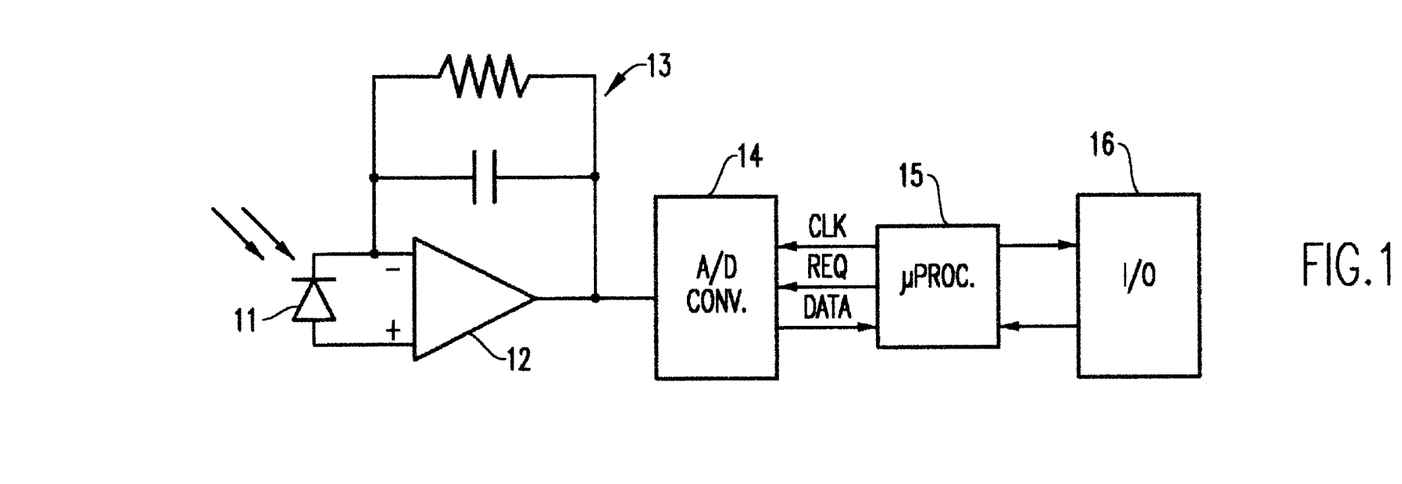
FIG. 1 is a block diagram of the data collection unit according to the preferred embodiment of the invention.

Referring now to the drawings, and more particularly to FIG. 1, there is shown a block diagram of the data collection unit of the UV radiometer according to the invention. A UV photodiode 11 is connected across the differential inputs of operational amplifier 12 which serves the function of a current to voltage converter. The photodiode 11 may have an integral lens having a filter characteristic which passes UV energy in a bandwidth of interest. An RC network 13 connected between the output of the operational amplifier 12 and its negative input also serves to define a bandwidth of interest for a converted electrical signal. The output of the operational amplifier is connected to an analog-to-digital (A/D) converter 14 which samples the electrical signal and stores a digital representation of the sampled signal. The A/D converter 14 is connected to and is controlled by a microprocessor 15. The microprocessor 15 generates a clock signal and a data request to the A/D converter 14 to cause the A/D converter to sample the electrical signal and read out a converted digital representation of the sampled signal.

Figure 2:
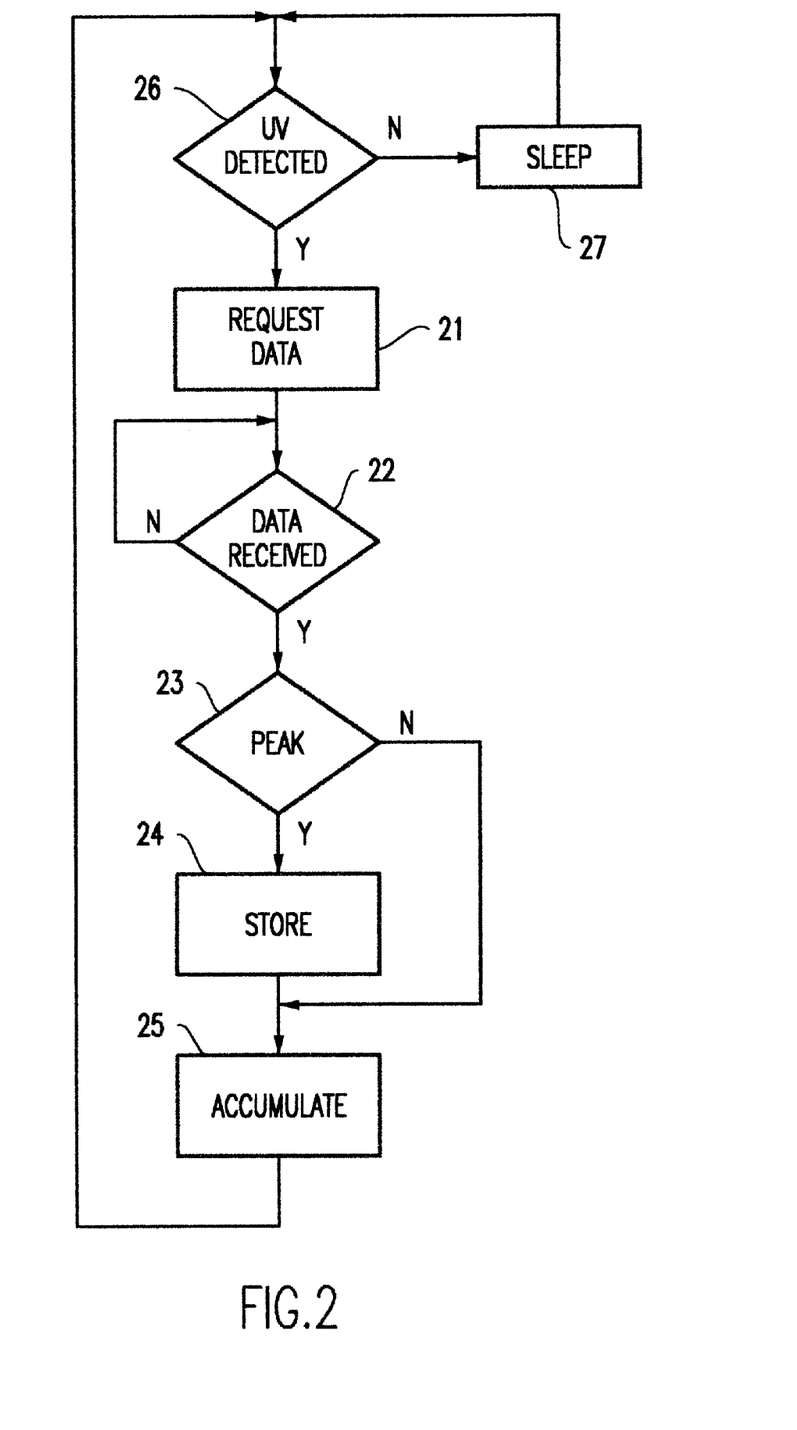
FIG. 2 is a flow chart showing the processing performed by the microprocessor in the circuit of FIG. 1.

As shown in the flow diagram of FIG. 2, the microprocessor 15 determines the peak value of a UV dosage during a measurement and accumulates the total value of the UV dosage during the measurement. More specifically, the microprocessor 15 in function block 21 sends a data request signal to the A/D converter 14. In decision block 22, the microprocessor 15 waits for the data output from the A/D converter 14. When the data is received, it is tested in decision block 23 to determine if the value of the current data is greater than the value of the highest previous value measured. This is a simple compare function which compares the data from the previous highest measurement stored in a register with the current measured value. If the value of the current data is greater than the value of the highest previous value measured, the current value is stored in the register in function block 24. In any case, the current measured value is accumulated with previous measured values in function block 25 and stored in a second register. A test is next made in decision block 26 to determine if UV radiation is detected. If not, the unit goes into a sleep mode 27 until UV radiation is again detected. The process repeats until UV is no longer detected, indicating and end of the measurement.

Returning now to FIG. 1, the registers storing the highest value UV dosage measured and the accumulated total value of the UV dosage are integral to the microprocessor 15. The microprocessor 15 is connected to an input/output (I/O) interface 16 which is accessed by the data reader with a corresponding I/O interface to read out the data stored in the two registers and, subsequent to reading out the data, to reset the two registers.

Figure 3:
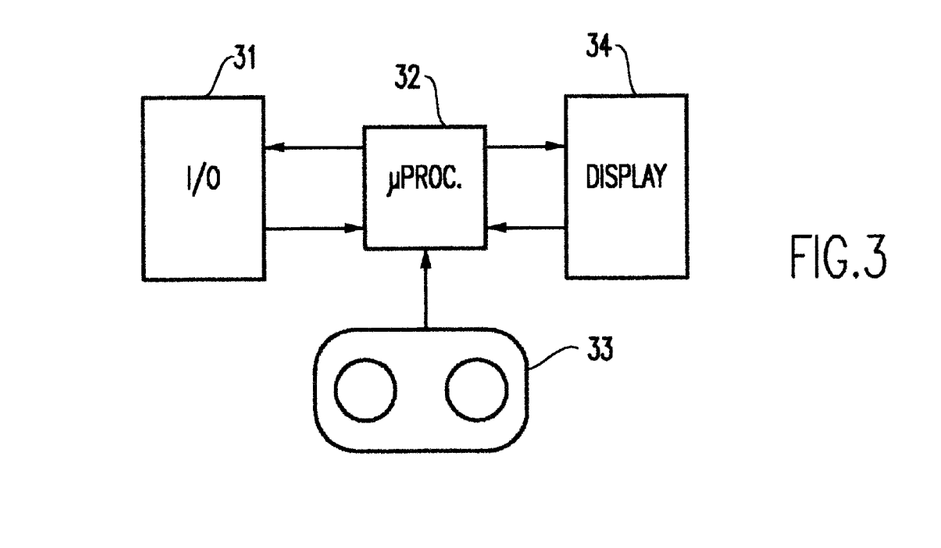
FIG. 3 is a block diagram of the data reader unit according to the preferred embodiment of the invention.

The data collection unit is shown in block diagram from in FIG. 3. The I/O interface 31 mates with the I/O interface 16 of the data collection unit. Typically, only two contacts are required between the two interfaces. The I/O interface 31 is connected by a bidirectional bus to the microprocessor 32.

The microprocessor 32 is controlled by the user interface 33 comprising, in its simplest implementation, two buttons, one to display data read from the data collection unit and one to reset the storage registers in the data collection unit. In response to a user input from the user interface 33, the microprocessor 32 generates a command which is transmitted via the I/O interface 31 to the I/O interface 16 of the data collection unit to read out the data in the two registers of the microprocessor 15. In a two button user interface, a single press of the display data button results in the total accumulated UV dosage value being read out, and a double press of the data button results in the peak UV dosage value being read out. The microprocessor 32 formats this data and outputs the data to a display 34, such as a liquid crystal display (LCD). The displayed value may be displayed with a legend such as "TOTAL" or "PEAK", as may be appropriate to the value being displayed. Once the values have been displayed, the user then presses the reset button which causes the microprocessor 32 to transmit a reset command via the I/O interface 31 to the I/O interface 16 to the microprocessor 15 of the data collection unit.

Figures 4, 7A, 7B, 7C:
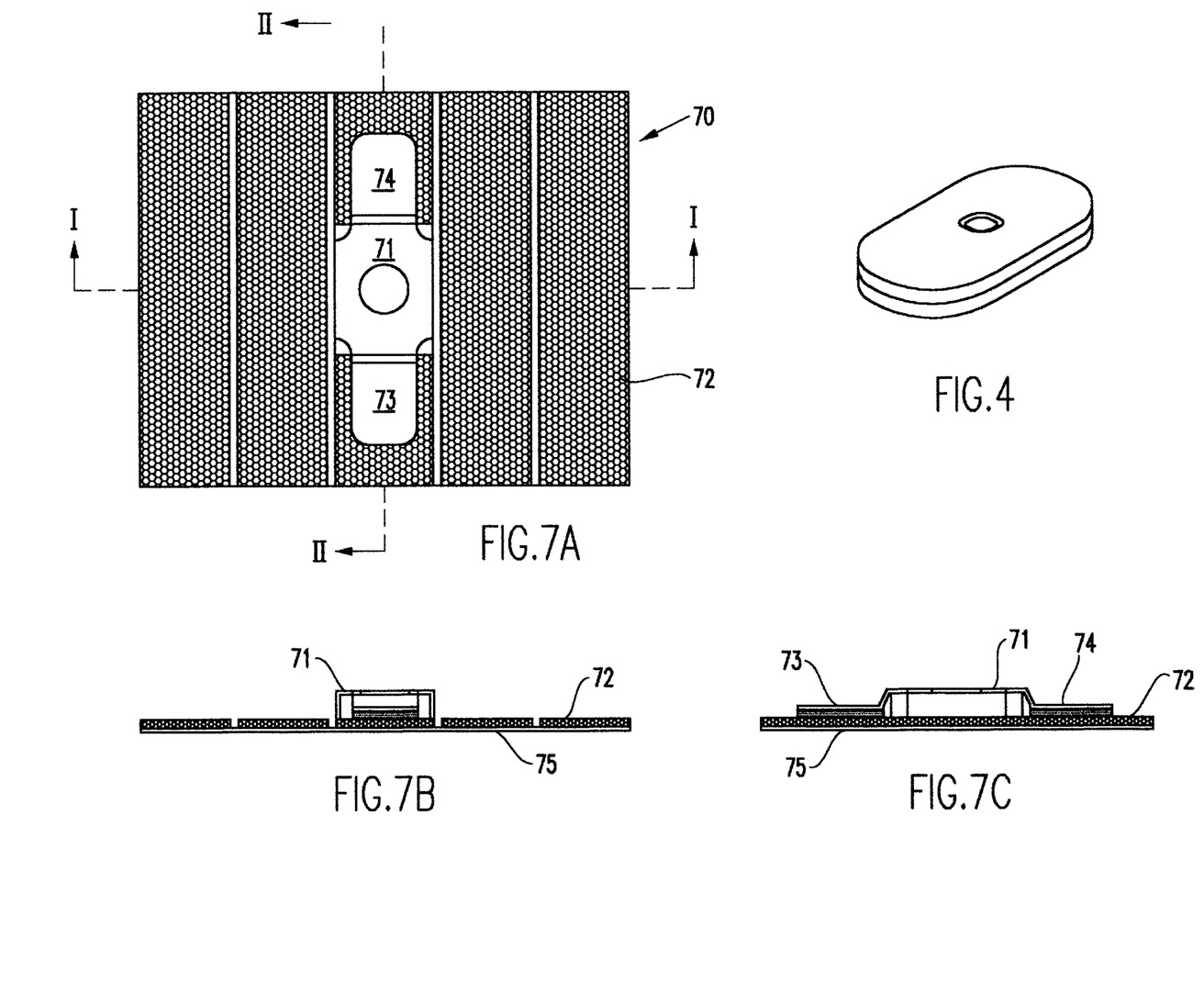
FIG. 4 is an isometric view of a preferred embodiment of the data collection unit.
FIGS. 7A, 7B and 7C are, respectively, a plan view and crosssectional views taken through section lines B—B and C—C of one form of carrier for the data collection unit which may be applied to a high speed web.

FIG. 4 is an isometric view of a preferred embodiment of the data collection unit illustrating is small and compact size, making it uniquely adapted to applications where conventional UV dosage measuring instruments cannot be used. In its preferred construction, the data collection unit is approximately 33 mm×25 mm×6 mm and weighs approximately 9 grams. This very small size allows the data collection unit to be used in applications which had heretofore been inaccessible.

Figure 5:
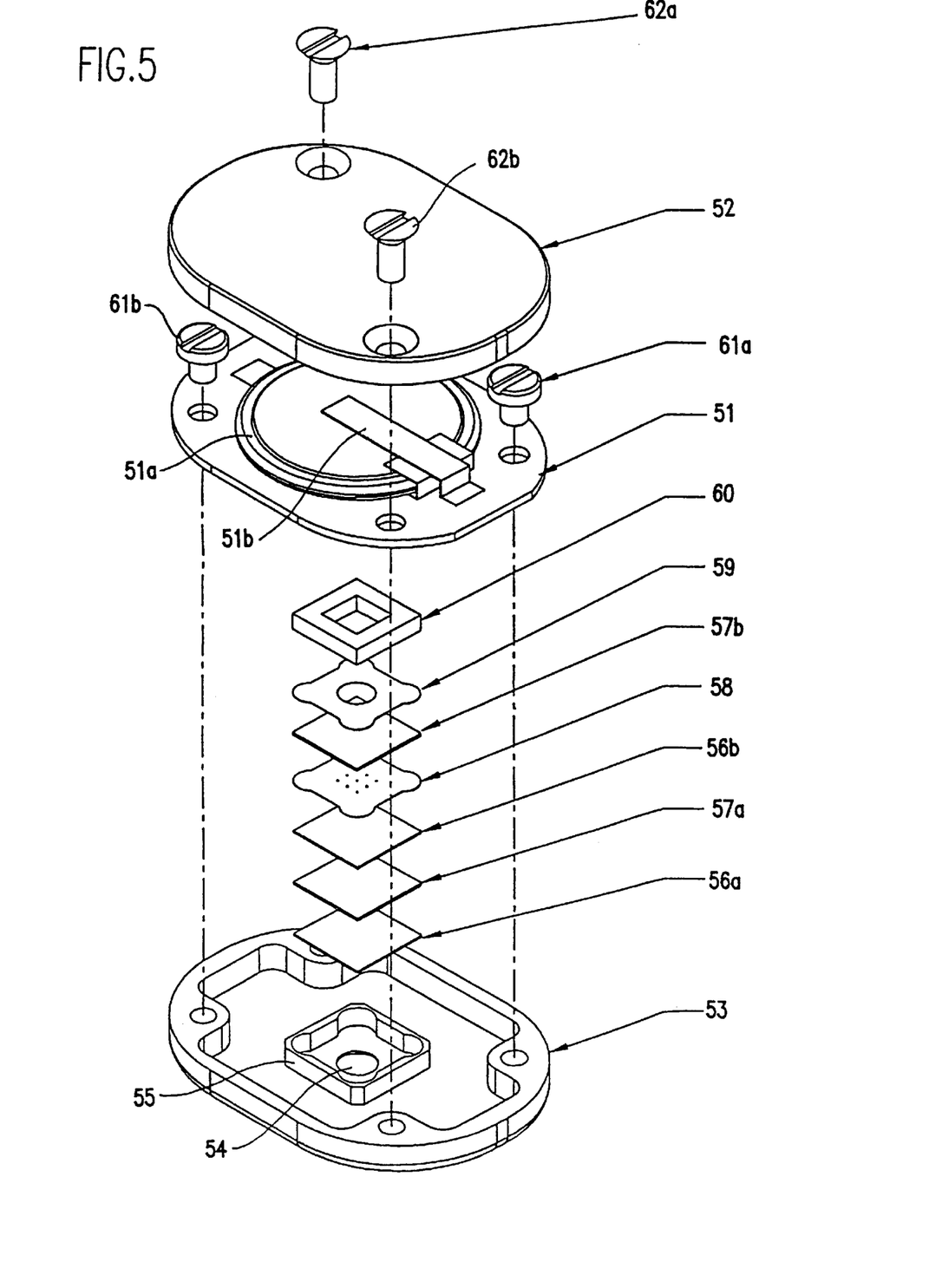
FIG. 5 is an exploded view showing the construction of the data collection unit of FIG. 4.

FIG. 5 is an exploded view of the data collection unit shown in FIG. 4. The data collection unit and its battery are mounted on a printed circuit board (PCB) which is mounted on the PCB assembly 51. The battery 51a is retained by a clip 51b which also serves as one of the electrical contacts to the PCB mounted on the opposite side of the PCB assembly 51. This assembly is sandwiched between housing bottom 52 and a housing top 53. The housing top 53 includes an aperture 54 surrounded by ridge 55 having a generally rectangular shape. Inserted into this ridge surround and covering the aperture 54 is a sandwich structure comprising windows 56a and 56b on either side of a diffuser 57a. Over the this structure is a plate 58 with a plurality of holes which serves as an attenuator. This is followed by a further diffuser 57b and an aperture plate 59. This entire assembly is retained within the ridge surround by a rectangular spacer 60. The PCB assembly 51 is attached to the housing top 53 by diagonally opposed screws 61a and 61b. Finally, the housing bottom 52 is secured to this subassembly by two diagonally opposed screws 62a and 62b which are displaced from screws 61a and 61b by approximately 180°. The housing top and housing bottom are electrically insulated one from the other and serve as the electrical contacts for the data reader.

Figure 6:
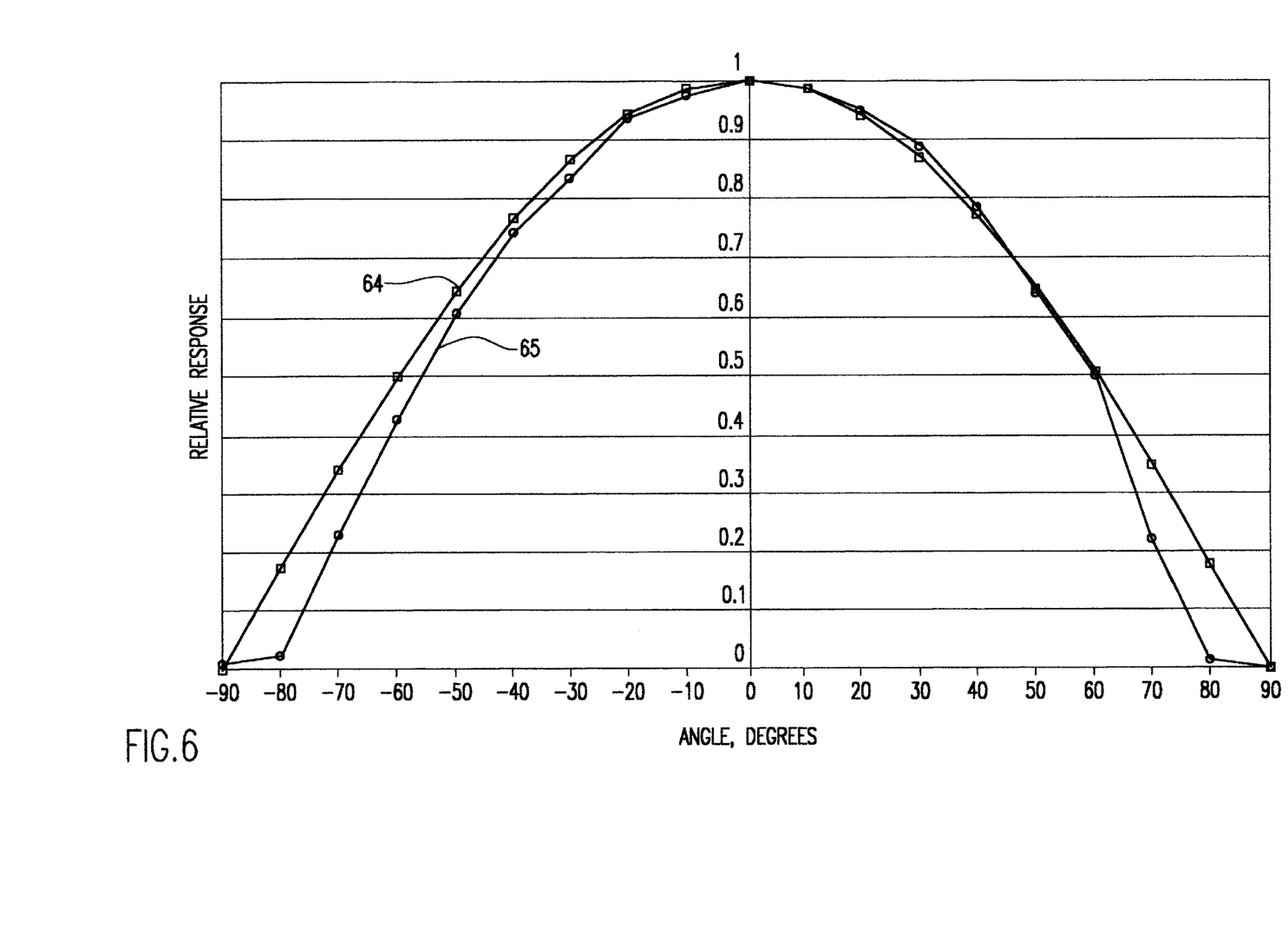
FIG. 6 is a graph showing the optical response of the data collection unit shown in FIGS. 4 and 5 contrasted with an ideal cosine response curve.

FIG. 6 is a graph showing the optical response for the data collection unit shown in FIGS. 4 and 5. The desired response is a cosine function, shown as curve 64. The measured response is shown as curve 65 is a close approximation to curve 64. This is accomplished by the sandwich structure comprising windows 56a and 56b on either side of diffuser 57a, the attenuator plate 58, and diffuser 57b.

The data collection unit of the UV radiometer according to the invention is easy to use. There are no wires or connectors. The unit is always "on", so there are no switches or buttons to push. The PCB mounted battery provides power, but to prolong the life of the battery, the circuitry goes into a power saving or "sleep" mode approximately four minutes after the last UV exposure. Battery life is typically 200 readings or one year. Battery replacement is facilitated by the construction of the data collection unit. By simply removing the two screws 62a and 62b, the housing bottom 53 can be removed to reveal the battery 51a.

The way that the data collection unit is exposed to UV energy will depend on the specific application. In a web press application, the data collection unit travels on the web and passes through the UV curing station. It is removed prior to reaching the print station location. Alternatively, the data collection unit can be "jogged" through the process at slower than normal speeds. The measurements are linear. For example, if the web is running at 300 feet/minute and is slowed to 30 feet/minute in order to "jog" the unit through, the resultant dosage readings can be divided by ten.

The data collection unit may travel through the UV process on an optional transport pad, shown in FIGS. 7A, 7B, and 7C. The transport pad is in the form of a square patch 70 having on its top surface a pocket 71 for receiving the data collection unit. The overall top surface, except for the immediate area of the pocket 71, is covered with one part of a hook-and-loop fabric 72. The pocket 71 has two tabs, 73 and 74, which have on their under surfaces the mating part of the hook-and-loop fabric. Either one of these tabs can be pulled up to permit insertion of the data collection unit into the pocket 71. The data collection unit is secured in the pocket 71 by simply pressing the tab back on the top surface of the patch 70. The bottom surface 75 of the patch 70 has applied to it a renewable tacky adhesive. This may be applied as a liquid using a suitable applicator or, in the alternative, the adhesive may be a double faced tape which may be renewed. The tacky adhesive is used to temporarily secure the patch 70 to a high speed web.

Figures 8, 9:
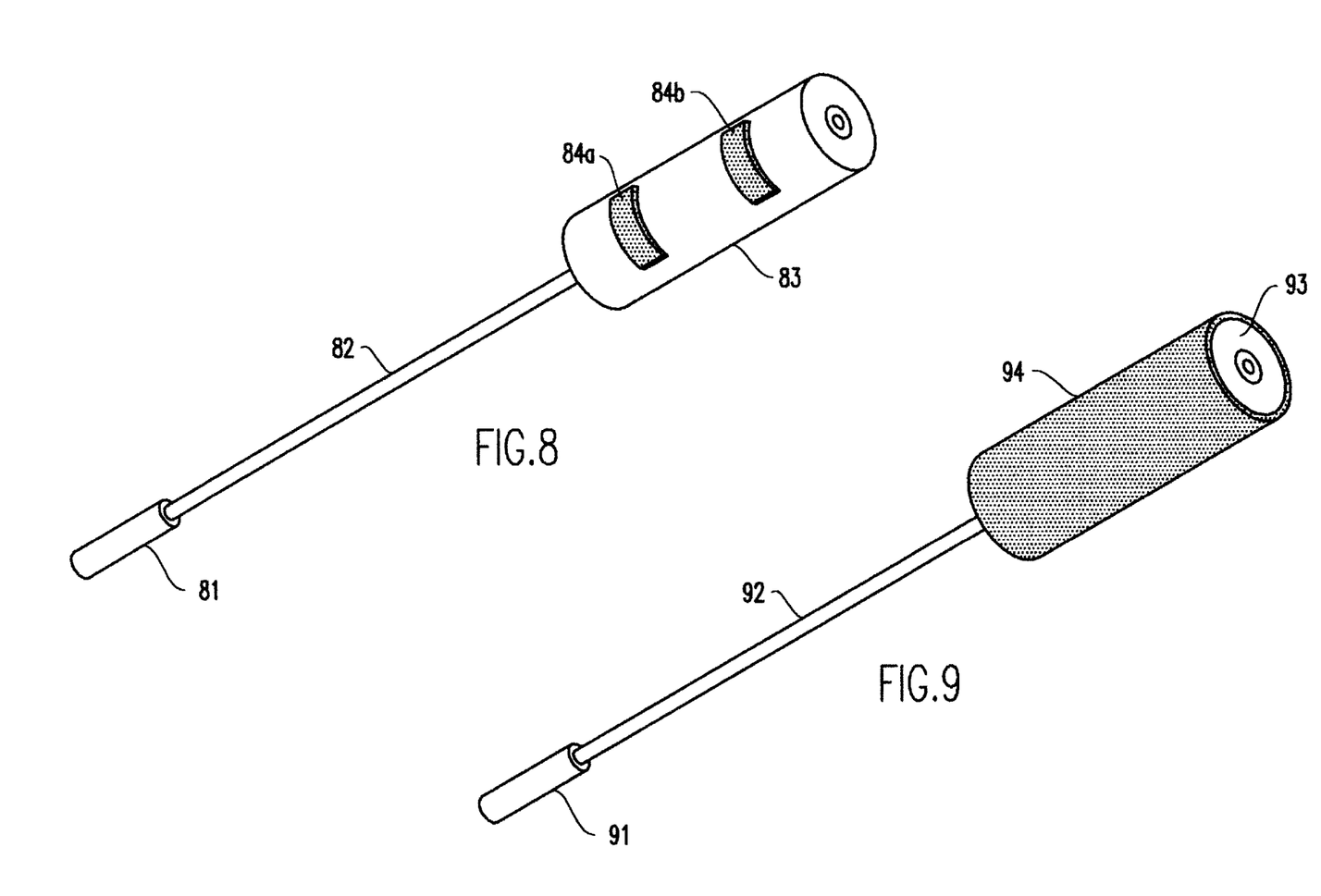
FIG. 8 is an isometric view of a device which may be used to apply the data collection unit, held in the carrier of FIGS. 7A and 7B, to a high speed web.
FIG. 9 is an isometric view of a device which may be used to remove the data collection unit, held in the carrier of FIGS. 7A and 7B, from a high speed web.

FIG. 8 shows an example of a roller device that can be used to apply the patch 70 to a high speed web. This device comprises a handle 81 at one end of a shaft 82, at the other end of which is a roller 83. The construction is not unlike a straightened paint roller; however, instead of a nap on the roller 83, there is provided two small strips of the mating hook-and-loop material 84a and 84b. With continuing reference to FIG. 8 and referring back to FIG. 7, the patch 70 is wrapped around the roller 83 so that the hook-and-loop material 84a and 84b makes contact with the hook-and-loop fabric 72 at opposite edges of the patch 70. In this way the tacky adhesive on the bottom surface 75 of the patch is exposed. By touching the roller 83 to the web with the axis of the roller perpendicular to the direction of travel of the web, the patch 70 is quickly adhered to the web.

After the patch 70 has passed through the UV curing station on the web, it is necessary to remove it for reading the measured data. This is accomplished with the device shown in FIG. 9. This device is similar to that shown in FIG. 8 in that it comprises a handle 91 at one end of a shaft 92, at the other end of which is a roller 93. This roller 93, however, is completely surfaced with the mating hook-and-loop material 94. With continuing reference to FIG. 9 and referring back to FIG. 7, when this roller is placed on the web with its axis of rotation perpendicular to the direction of travel of the web and the patch 70 carrying the data collection unit passes under it, the full area of the hook-and-loop fabric 72 on the top surface of the patch 70 will be engaged by the hook-and-loop material 94. The engagement of the mating hook-and-loop materials is stronger than the adhesion of the tacky adhesive on the bottom of the patch 70, causing the patch to be removed from the web.

The patch adheres to the web even while traveling vertically and/or at high speeds. Due to its extremely small surface area and very low profile, the data collection unit can actually travel around idler rollers. The data collection unit's sampling rate of 2000 samples per second ensures that measurements can be taken at high web speeds with accuracy. The same patch 70 can also be used to provide direct adherence to other items, e.g., cans, tubes, etc., which need to pass through the curing process. In many applications, adhesion to a web or product is not necessary for traveling through the UV process. In these applications, the data collection unit is sufficiently small that it can be inserted directly into a can, cup or tube. Compact disc (CD) and digital versatile disc (DVD) manufactures who screen and/or coat CDs and DVDs can put the data collection unit into one of the CD "nests" to check if total UV dosage meets parameters for optimum cure.

Figure 10:
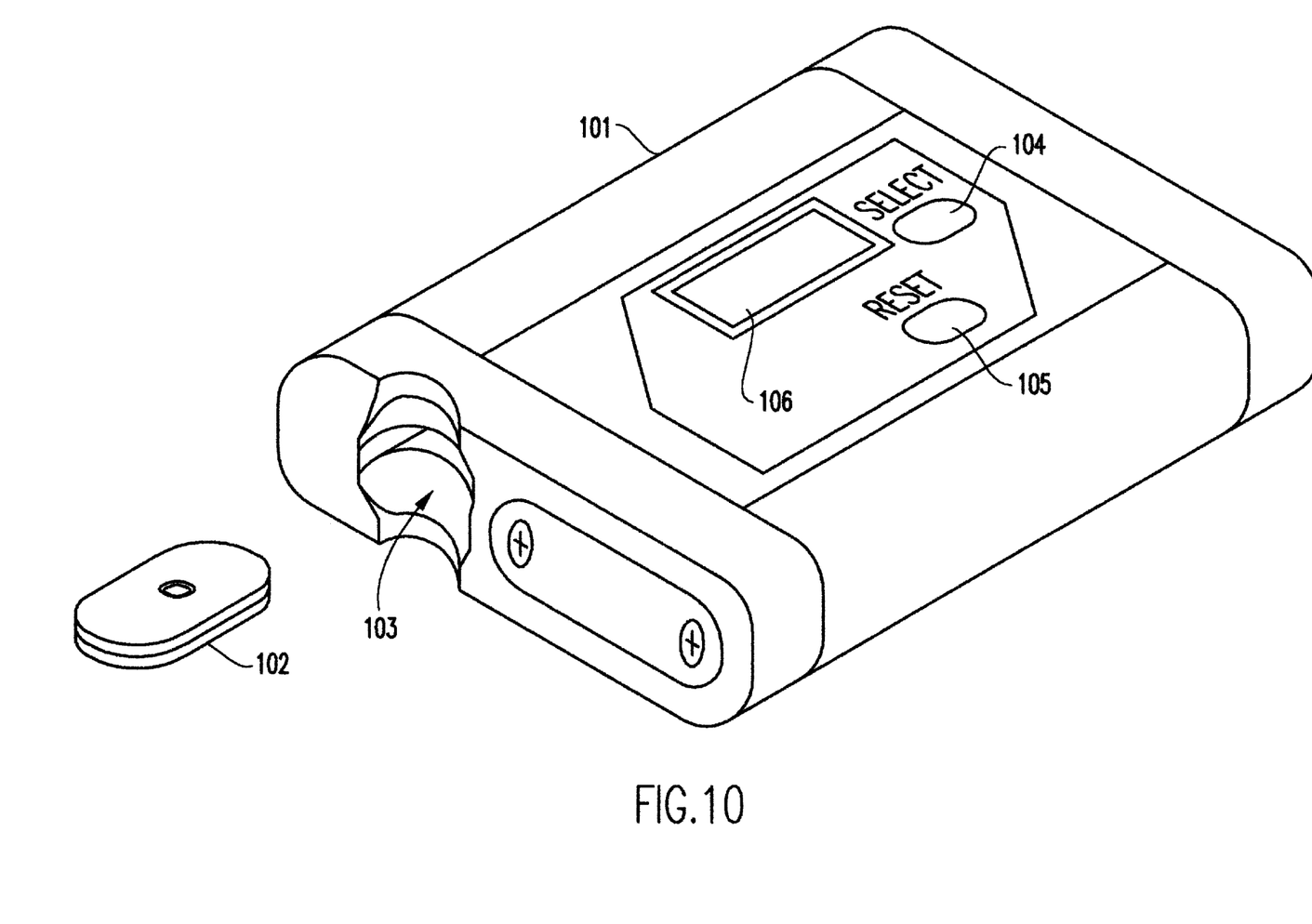
FIG. 10 is an isometric view of the preferred embodiment of the data reader unit of FIG. 3.

After taking a measurement, the data collection unit is inserted into the data reader. This is illustrated in FIG. 10. The data reader 101 is, like the data collection device, is battery powered. A technician working on a line might be provided with a lanyard or holster to carry the data reader and, upon removing the data collection device from the carrier, the technician would insert the data collection device 102 into a slot 103 provided in one end of the data reader 101. There is no polarity to the data collection device or data reader, so the data collection unit 102 can be inserted in any orientation in the slot 103. The data reader includes on one face two buttons, a select button 104 and a reset button 105, and an LCD display 106. Pushing the "select" button 104 allows the user to check the UV dosage which is displayed in LCD display 106. A single press of the select button displays the total UV dosage, and a double press of the select button displays the peak UV dosage. The dosage remains stored in the data collection unit until the "reset" button 105 on the data reader is pushed. This causes the registers in the data collection device to be cleared for another measurement.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An ultraviolet (UV) radiometer for use in measuring UV dosage applied to a work piece transported through a UV curing system comprising:

a data collection unit which has a size allowing it to pass through the UV curing system; and a data reader into which the data collection unit is inserted for displaying and/or processing the actual data collected by the data collection unit during a process run.

2. The UV radiometer recited in claim 1 wherein the data collection unit comprises:

a UV detecting diode connected to a current to voltage converter;

an analog-to-digital (A/D) converter connected to receive a voltage signal from the current to voltage converter;

a microprocessor connected to the A/D converter for controlling sampling of the voltage signal and reading out and storing converted digital values; and an input/output (I/O) interface connected to the microprocessor providing a data path for stored digital values.

3. The UV radiometer recited in claim 2 wherein the microprocessor is programmed to test each digital value to detect a peak value corresponding to a peak UV dosage and to accumulate digital values corresponding to a total UV dosage.

4. The UV radiometer recited in claim 2 wherein the data reader comprises:
- a second I/O interface which mates with the first mentioned interface;
- a second microprocessor connected to the second I/O interface;
- a user interface connected to the second microprocessor for inputting commands to read data and to reset the data collection unit, said second microprocessor in response to a command to read data sending a data request to the first mentioned microprocessor via the first mentioned and the second I/O interface and in response to a command to reset sending a reset command to the first mentioned microprocessor; and
- a display connected to the second microprocessor, said second microprocessor formatting data received from the first mentioned microprocessor and displaying the data on the display.

5. The UV radiometer recited in claim 4 wherein the first mentioned microprocessor is programmed to test each digital value to detect a peak value corresponding to a peak UV dosage and to accumulate digital values corresponding to a total UV dosage and wherein the second microprocessor responds to the user interface for separately reading out and displaying peak and total UV dosage.

6. The UV radiometer recited in claim 1 further comprising a carrier into which the data collection unit is inserted, the carrier having means for temporary attachment to means transporting product subject to UV curing.

7. The UV radiometer recited in claim 6 wherein the carrier comprises a patch of flexible material having a top surface and a bottom surface, the top surface having formed thereon a pocket for receiving the data collection unit, and the bottom surface being covered by a renewable tacky adhesive for temporarily adhering the patch to a web.

8. The UV radiometer recited in claim 7 wherein at least a portion of the top surface of the patch is covered with one part of a hook and loop material, a mating part of the hook and loop material facilitating the removal of the patch from the web.

9. The UV radiometer recited in claim 1 wherein the data collection unit comprises:
- a printed circuit board assembly including a battery retained by a clip which also serves as an electrical contact to a printed circuit board mounted on the printed circuit board assembly;
- a housing bottom and a housing top between which the printed circuit board assembly is sandwiched, the housing top including an aperture surrounded by ridge;
- a sandwich structure inserted in the ridge surrounding the aperture, the sandwich structure comprising first and second windows on either side of a first diffuser;
- a plate with a plurality of holes over the sandwich structure which serves as an attenuator; and
- a second diffuser and an aperture plate aligned with a photodiode on the printed circuit board;
- the printed circuit board assembly being attached to the housing top and the housing bottom being secured to the housing top.

10. The UV radiometer recited in claim 9 wherein the housing top and the housing bottom are electrically insulated from one another and serve as electrical contracts for the data reader.

11. A method of making a measurement of ultraviolet (UV) dosage applied to a work piece in a UV curing system in which product subject to UV curing is carried through the UV curing system, the method comprising the steps of:
- temporarily attaching a data collection unit to pass through the UV curing system, the data collection unit having dimensions that allows it to pass through a UV curing station;
- re-acquiring the data collection unit after passing through the UV curing station; and
- inserting the data collection unit into a data reader which displays and/or processes data collected by the data collection unit.

12. The method recited in claim 11 wherein the data collection unit is first inserted in a carrier and the carrier is temporarily attached to means transporting product subject to UV curing.

13. The method recited in claim 12 wherein the carrier comprises a patch of flexible material having a top surface and a bottom surface, the top surface having formed thereon a pocket for receiving the data collection unit, and the bottom surface being covered by a renewable tacky adhesive for temporarily adhering the patch to a web.

14. The method recited in claim 13 wherein at least a portion of the top surface of the patch is covered with one part of a hook and loop material, the step of temporarily attaching being performed by using a first roller having a small portion of its surface covered by a mating part of the hook and loop material, the patch being attached to the first roller with the bottom surface facing outwardly and then pressing the roller to the moving web to attach the patch to the web with the tacky adhesive, and the step of removing being performed by using a second roller having its surface completely covered by a mating part of the hook and loop material, the second roller being pressed to the moving web so that the patch carrying the data collection unit passes under the second roller, the hook and loop material on the second roller having a connection force exceeding the adhesion of the tacky adhesive thereby facilitating the removal of the patch from the web.

15. A data collection unit for use in measuring ultraviolet (UV) dosage applied to a work piece transported through a UV curing system, the data collection unit comprising:
- a UV detecting diode connected to a current to voltage converter;
- a sandwich structure comprising first and second windows on either side of a first diffuser;
- a plate with a plurality of holes over the sandwich structure which serves as an attenuator; and
- second diffuser and an aperture plate aligned with the UV detecting diode;
- an analog-to-digital (A/D) converter connected to receive a voltage signal from the current to voltage converter;
- a microprocessor connected to the A/D converter for controlling sampling of the voltage signal and reading out and storing converted digital values; and
- an input/output (I/O) interface connected to the microprocessor providing a data path for stored digital values.

16. The data collection unit recited in claim 15 wherein the microprocessor is programmed to test each digital value to detect a peak value corresponding to a peak UV dosage and to accumulate digital values corresponding to a total UV dosage.

17. The data collection unit recited in claim 16 further comprises:
- a printed circuit board assembly including a battery retained by a clip which also serves as an electrical contact to a printed circuit board mounted on the printed circuit board assembly, the printed circuit board having mounted thereon the UV detecting diode, the A/D converter, the microprocessor, and the I/O interface;
- a housing bottom and a housing top between which the printed circuit board assembly is sandwiched, the housing top including an aperture surrounded by ridge and the housing bottom and housing top being electrically isolated from one another;
- said sandwich structure inserted in the ridge surrounding the aperture;
- the printed circuit board assembly being attached to the housing top and the housing bottom being secured to the housing top.

* * * * *